(12) United States Patent
Wang et al.

(10) Patent No.: US 9,740,886 B2
(45) Date of Patent: Aug. 22, 2017

(54) ENHANCED SECURITY FOR HARDWARE DECODER ACCELERATOR

(71) Applicant: Sony Interactive Entertainment Inc., Tokyo (JP)

(72) Inventors: Jason N. Wang, Palo Alto, CA (US); Cheng Huang, Foster City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 45 days.

(21) Appl. No.: 14/192,782

(22) Filed: Feb. 27, 2014

(65) Prior Publication Data
US 2014/0283039 A1  Sep. 18, 2014

Related U.S. Application Data

(60) Provisional application No. 61/789,855, filed on Mar. 15, 2013.

(51) Int. Cl.
  *G06F 21/76*  (2013.01)
  *G06F 12/14*  (2006.01)
  *G06F 21/55*  (2013.01)

(52) U.S. Cl.
  CPC .............. *G06F 21/76* (2013.01); *G06F 12/14* (2013.01); *G06F 21/556* (2013.01)

(58) Field of Classification Search
  CPC ......... G06F 21/556; G06F 21/76; G06F 12/14
  See application file for complete search history.

(56) References Cited

U.S. PATENT DOCUMENTS

| 7,346,863 | B1 * | 3/2008 | Pritchard et al. ............. 716/102 |
| 7,474,132 | B2 | 1/2009 | Cheng |
| 7,474,312 | B1 * | 1/2009 | Rohrer et al. ................. 345/530 |
| 7,478,237 | B2 | 1/2009 | Costea et al. |
| 7,685,254 | B2 | 3/2010 | Pandya |
| 8,397,069 | B2 | 3/2013 | Alkove et al. |
| 2007/0230581 | A1 * | 10/2007 | Orr .......................... 375/240.21 |
| 2008/0010538 | A1 * | 1/2008 | Satish et al. .................... 714/38 |
| 2009/0060032 | A1 * | 3/2009 | Schmit ................... H04N 19/61 375/240.01 |
| 2010/0195742 | A1 * | 8/2010 | Wu .......................... 375/240.27 |

(Continued)

FOREIGN PATENT DOCUMENTS

CN   101411198 A   4/2009

OTHER PUBLICATIONS

International Search Report and Written Opinion for International Application No. PCT/US2014/019601, dated Jul. 31, 2014.

(Continued)

*Primary Examiner* — Robert Leung
(74) *Attorney, Agent, or Firm* — JDI Patent; Joshua D. Isenberg; Robert A. Pullman

(57) ABSTRACT

A software security layer may be used to protect a system against exploitation of a hardware encoder accelerator by malicious data embedded in the one or more frames of encoded digital streaming data. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

27 Claims, 5 Drawing Sheets

(56) References Cited

U.S. PATENT DOCUMENTS

| | | | |
|---|---|---|---|
| 2011/0214157 A1 | 9/2011 | Korsunsky et al. | |
| 2012/0121025 A1* | 5/2012 | Bonaparte et al. | 375/240.27 |
| 2013/0227521 A1* | 8/2013 | Bourd et al. | 717/110 |
| 2013/0276096 A1* | 10/2013 | Symes et al. | 726/16 |
| 2013/0333040 A1* | 12/2013 | Diehl et al. | 726/24 |
| 2014/0310809 A1* | 10/2014 | Li | G06F 21/52 726/23 |

OTHER PUBLICATIONS

U.S. Appl. No. 61/789,855, to Jason N. Wang, filed Mar. 15, 2013.

Recommendation ITU-T H.264, Series H: Audiovisual and Multimedia Systems Infrastructure of audiovisual services—Coding of moving video, "Advanced video coding for generic audiovisual services", International Telecommunication 30 Union, Telecommunication Standardization Sector, Geneva, Switzerland, Jan. 2012.

European Search Report and Written Opinion for EP Application No. 14770996.8, dated Oct. 13, 2016.

Office Action dated Mar. 31, 2017 for Chinese Patent Application 201480016140.6.

\* cited by examiner ately greater compression than its predecessors. The H.264 standard is expected to offer up to twice the compression of the earlier MPEG-2 standard. The H.264 standard is also expected to offer improvements in perceptual quality. As a result, more and more video content is being delivered in the form of AVC (H.264)—coded streams. Two rival DVD formats, the HD-DVD format and the Blu-Ray Disc format support H.264/AVC High Profile decoding as a mandatory player feature. AVC (H.264) coding is described in detail in "*Recommendation ITU-T H.264, Series H: AUDIOVISUAL AND MULTIMEDIA SYSTEMS Infrastructure of audiovisual services—Coding of moving video*, "Advanced video coding for generic audiovisual services", International Telecommunication Union, Telecommunication Standardization Sector, Geneva, Switzerland, January, 2012, the entire contents of which are incorporated herein by reference for all purposes.

ENHANCED SECURITY FOR HARDWARE DECODER ACCELERATOR

CLAIM OF PRIORITY

This application claims the priority benefit of U.S. Provisional Patent Application No. 61/789,855, filed Mar. 15, 2013, the entire disclosures of which are incorporated herein by reference.

FIELD OF THE INVENTION

Aspects of the present disclosure are related to decoding of compressed digital signals. In particular, the present disclosure is related to security for decoder accelerators.

BACKGROUND

Digital signal compression (sometimes referred to as video coding or video encoding) is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; and AVC (H.264). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

MPEG-4 AVC (Advanced Video Coding), also known as H.264, is a video compression standard that offers significantly Video encoding can be done on a general purpose computer in software or may be done with specialized hardware referred to as a hardware video encoder. Use of a hardware video encoder is regarded as key to achieving high performance video compression with low system resource usage.

A hardware decoder accelerator is a system resource shared by multiple users. Typically, the accelerator has higher than normal process privilege to access user's private memory, system registers and sometimes kernel memory. This makes the accelerator a possible target for security attacks.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Aspects of the present disclosure are directed to a software security enhancement layer to protect the hardware decoder accelerator from being compromised and minimize the damage if the accelerator is compromised.

Introduction

In the prior art, hardware decoder accelerators have typically been implemented by individual hardware device vendors. Each hardware vendor defines their own security features according to their product's requirements and implements these security features as part of the hardware. For example, for many personal computer (PC) hardware vendors, the security goal is to protect copyrighted video content. So, most of hardware accelerators have content protection related security features.

Some devices have different security goals. Specifically, for certain game console providers, the security goal may be to protect both video content and system kernel for the game console itself. As a result, we have to enhance the security with an extra software layer.

The need for enhanced security for a hardware decoder may not be apparent to computer security expert. From a computer security expert's point of view, a hardware decoder accelerator only performs video signal processing tasks and it only needs a very simple security protection. However, from a video processing expert's point of view, the hardware decoder accelerator is a programmable device configured to execute instructions embedded in encoded video streams. By carefully designing an input video stream, the decoder accelerator could be instructed to do anything. This includes things that are harmful to the device. Therefore, enhanced security protection is necessary for certain devices that use a hardware decoder accelerator.

According to certain aspects of the present disclosure, enhanced security for a decoder accelerator may be implemented by a software security enhancement layer. By way of example, and not by way of limitation, such a software layer could be implemented as a piece of software in a decoder service daemon, the decoder accelerator kernel driver or inside the accelerator firmware. It could also be implemented as a block of hardware. Some security protections may also be applied in hardware with a hardware video encoder accelerator.

Detailed Explanation

Figure 1:
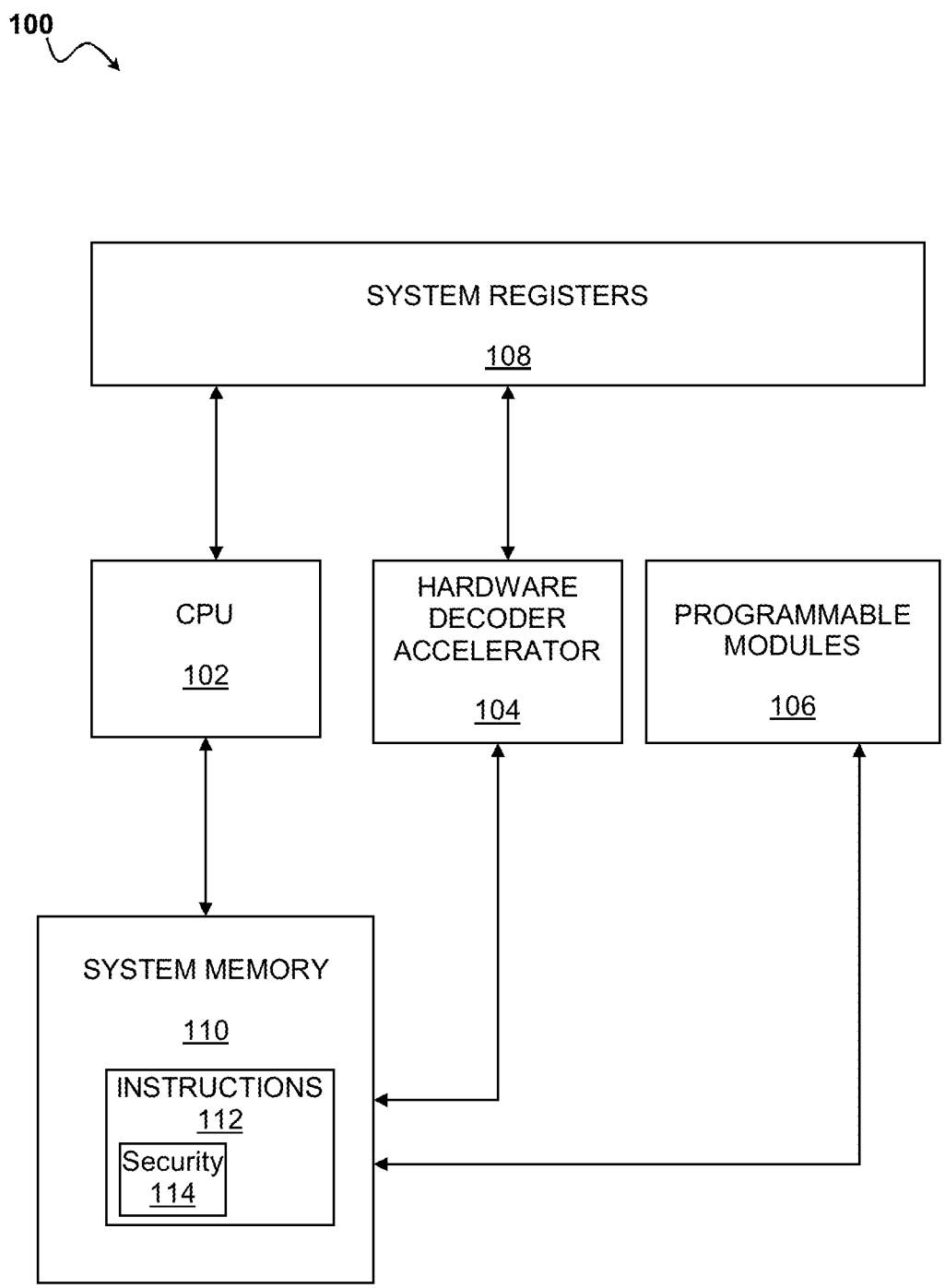
FIG. 1 is a block diagram of a computing system that uses a system that includes a hardware video decoder accelerator and a software security layer for the accelerator according to an aspect of the present disclosure.

As shown in FIG. 1, a computer system 100 may include a central processor unit (CPU) 102, an integrated hardware video decoder accelerator 104, and one or more programmable modules 106. The accelerator 104 is configured to decode coded video streams. These coded video streams may follow video coding standards, such as H.264, MPEG2, MPEG4 and VCI. The CPU 102 controls the hardware decoder accelerator 104 through some system registers 108. Both the CPU 102 and the accelerator 104 share a common system memory 110. Optionally, the hardware decoder accelerator 104 may also be programmable. Part of the decoder functionality could be implemented in software, which may be implemented as instructions 112 stored in the memory 110. Augmenting a hardware accelerator's capabilities with software can make the accelerator more flexible. However, it also creates more opportunity for hackers to attack the accelerator 104. This is significant since currently almost all hardware decoder accelerators on the market are programmable. To prevent this, the instructions 112 may include a software security layer 114, which may be configured as discussed below.

Figure 2:
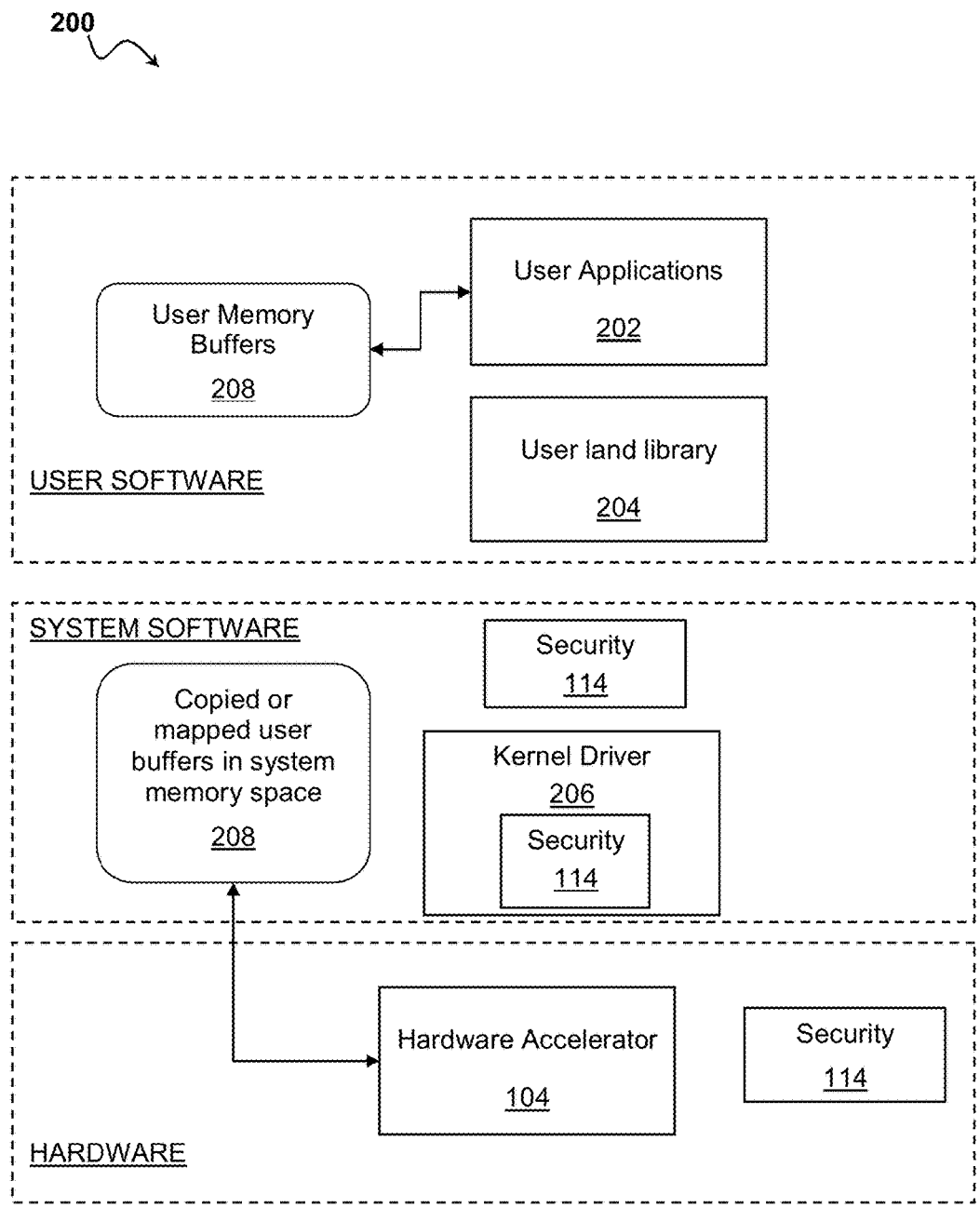
FIG. 2 is a block diagram illustrating an example of a software stack on top of a hardware accelerator indicating possible implementations of enhanced security according to an aspect of the present disclosure.

The instructions 112 may be implemented in a software stack that includes user software, system software and hardware layers. FIG. 2 shows an example of a typical software stack 200 that may operate on top of the hardware accelerator 104 indicating possible locations within the stack for the security layer 114. As shown in FIG. 2, one or more user applications 202 may call functions in a user land library 204 to submit decoding tasks to a kernel driver 206. The user applications 202 and land library 204 are in the part of a software stack referred to as "user software". The kernel driver 206 is part of the operating system software. The kernel driver 206 operates the hardware accelerator 104 via the system registers 108.

According to aspects of the present disclosure the security enhancement layer 114 could be an extra module in the hardware layer (e.g., in firmware) or in the kernel driver 206. Alternatively, the security enhancement layer could be an extra piece of system software above the kernel driver 206.

As shown in FIG. 2, a user application only can access memory buffers 208 in a user memory space within the system memory 110. Sometimes, the hardware accelerator 104 cannot access the user's memory space. In this case, the operating system software could map or copy the user's data buffers 208 in system memory for the hardware accelerator 104.

To understand how the security enhancement layer 114 might work, it is useful to understand how the hardware accelerator 104 works and how it is vulnerable to hackers and other security threats. Typically, the procedure to decode a picture with a hardware accelerator may be summarized as follows.

A user application stores an input video stream in a memory buffer in the user's memory space. Later, the operating system software will open the user memory buffer for the hardware accelerator 104 to access or the operating system copies the user memory buffer to a hardware accelerator visible memory space. Sometimes, this hardware accelerator visible memory space is the kernel memory space.

The user application 202 creates a decoding task by calling functions in the user land library 204. The control parameters of a video decoding task depend on the actual hardware accelerator 104 and the operating system. For example, Microsoft DXVA defines how a user application uses a hardware accelerator on Windows PCs.

The kernel driver 206 writes a user request into system registers. The hardware decoder accelerator 104 receives a decoding command and decodes a portion of the input video stream. The decoding result is stored in a user visible memory buffer 208. The hardware accelerator 104 notifies the kernel driver 206 that a task is finished via system registers 108. The user application 202 receives decoding done notification from the kernel driver 206 and the decoder output data from the hardware accelerator 104.

To accomplish the task above, the hardware decoder accelerator 104 has certain privileges. For example, the hardware decoder accelerator may be able to read and/or write video decoding buffers of all users. For some systems, the decoder may have access to kernel memory space. The hardware decoder accelerator may also be able to read and/or write some system registers. In addition for some systems, if the hardware accelerator 104 is programmable, the program instructions and data are stored in the kernel memory space.

Therefore, if a hardware decoder accelerator is compromised by a hacker, the hacker could, steal video content from other decoder applications. For example, a hacker could make an illegal copy of a Blu-ray disk. Furthermore, a hacker may take advantage of a compromised decoder accelerator to steal system secrets, such as encryption keys, by reading system registers. Furthermore, in extreme cases, a compromised hardware decoder accelerator could compromise the system kernel allowing a hacker to take over the whole system 100.

Minimizing the Damage

The system 100 may be configured to minimize the damage if the hardware decoder accelerator 104 is compromised. One possible configuration of the system would be as follows.

1. The system 100 would only give the hardware decoder 104 permission to read or write registers if it is necessary.
2. If the hardware accelerator is programmable, the hardware accelerator instructions and data can be put in a memory space other than the kernel memory space and any user's memory space. This way the hardware accelerator 104 can execute instructions, and read or write data to its own memory space.
3. If a user buffer is open for hardware decoder access, only open the necessary part of the buffer.

Limited by design, not all the hardware accelerators could meet the recommendations above. For example, most of hardware accelerators integrated in PC graphic card can access more registers than necessary and there is no way to put a constraint on that. So, it is necessary to implement an extra protection layer to make it difficult to hack a hardware accelerator.

Video Decoding

Figure 3:
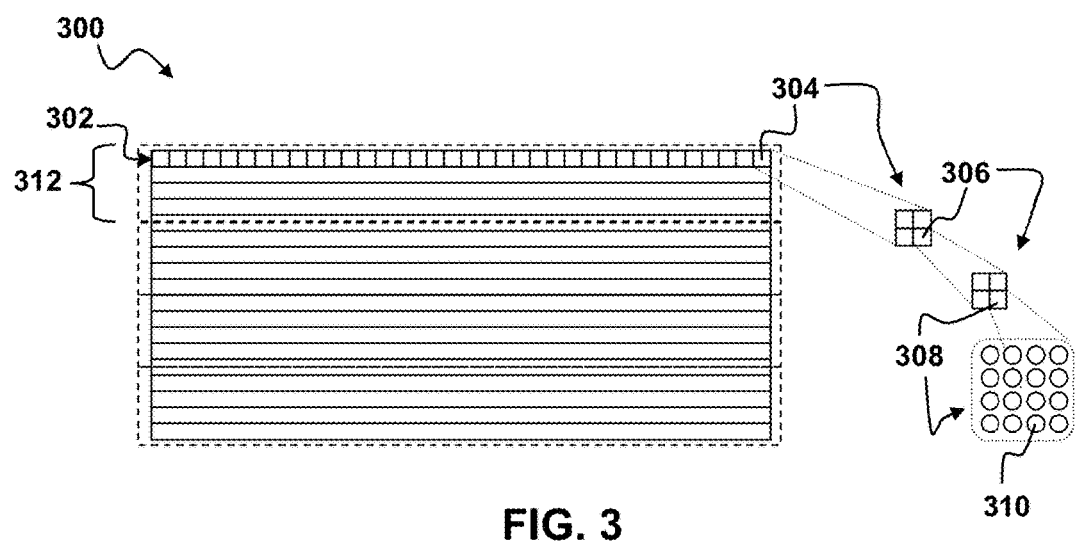
FIG. 3 is a schematic diagram illustrating one possible division of a streaming data picture within the context of aspects of the present disclosure.

Before proceeding to describe how the security software 114 may protect the hardware decoder accelerator against malicious attack, it is useful to understand how video pictures are encoded. By way of example, and not by way of limitation, as shown in FIG. 3, a single picture 300 (e.g., a digital video frame) may be broken down into one or more sections. As used herein, the term "section" can refer to a group of one or more pixels within the picture 300. A section can range from a single pixel within the picture, up to the whole picture. Non-limiting examples of sections include slices 302, macroblocks 304, sub-macroblocks 306, blocks 308 and individual pixels 310. As illustrated in FIG. 3, each slice 302 contains one or more rows of macroblocks 304 or portions of one or more such rows. The number of macroblocks in a row depends on the size of the macroblocks and the size and resolution of the picture 300. For example, if each macroblock contains sixteen by sixteen pixels then the number of macroblocks in each row may be determined by dividing the width of the picture 300 (in pixels) by sixteen. Each macroblock 304 may be broken down into a number of sub-macroblocks 306. Each sub-macroblock 306 may be broken down into a number of blocks 308 and each block may contain a number of pixels 310. By way of example, and without limitation of the invention, in a common video coding scheme, each macroblock 304 may be broken down into four sub-macroblocks 306. Each sub-macroblock may be broken down into four blocks 308 and each block may contain a four by four arrangement of sixteen pixels 310.

It is noted that each picture may be either a frame or a field. A frame refers to a complete image. A field is a portion of an image used for to facilitate displaying the image on certain types of display devices. Generally, the pixels in an image are arranged in rows. To facilitate display an image may sometimes be split by putting alternate rows of pixels into two different fields. The rows of pixels in the two fields can then be interlaced to form the complete image. For some display devices, such as cathode ray tube (CRT) displays, the two fields may simply be displayed one after the other in rapid succession. The afterglow of the phosphors or other light emitting elements used to illuminate the pixels in the display combined with the persistence of vision results in the two fields being perceived as a continuous image. For certain display devices, such as liquid crystal displays, it may be necessary to interlace the two fields into a single picture before being displayed. Streaming data representing encoded images typically includes information indicating whether the image is a field or a frame. Such information may be included in a header to the image.

Figure 4:
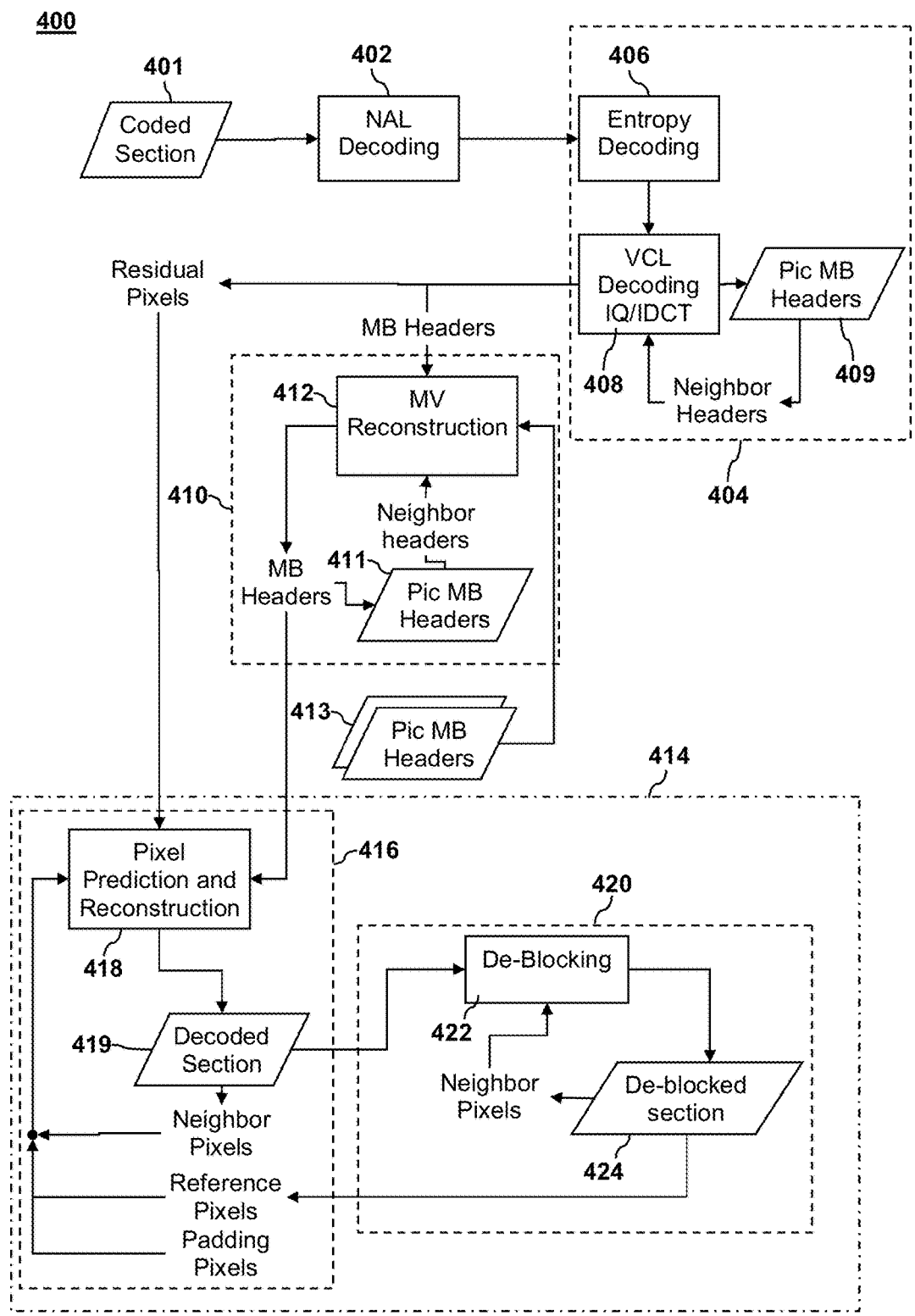
FIG. 4 is a process flow model illustrating an example of a possible method for the decoding of streaming data that may be used in conjunction with aspects of the present disclosure.

FIG. 4 illustrates an example of a possible process flow in a method 400 for decoding of streaming data 401 that may be used in conjunction with aspects of the present disclosure. This particular example shows the process flow for video decoding, e.g., using the AVC (H.264) standard. The coded streaming data 401 may initially be stored in a buffer. Where coded streaming data 401 (e.g., a video data bitstream) has been transferred over a network, e.g., the Internet, the data 401 may initially undergo a process referred to as network abstraction layer (NAL) decoding, indicated at 402. NAL decoding may remove from the data 401 information added to assist in transmitting the data. Such information, referred to as a "network wrapper" may identify the data 401 as video data or indicate a beginning or end of a bitstream, bits for alignment of data, and/or metadata about the video data itself.

In addition, by way of example, the network wrapper may include information about the data 401 including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section. Due to its complexity, NAL decoding is typically done on a picture and slice level. The smallest NAL buffer used for NAL decoding is usually slice sized.

In some embodiments, after NAL decoding at 402, the remaining decoding illustrated in FIG. 4 may be implemented in three different thread groups or task groups referred to herein as video coded layer (VCL) decoding 404, motion vector (MV) reconstruction 410 and picture reconstruction 414. The picture reconstruction task group 414 may include pixel prediction and reconstruction 416 and post processing 420. In some embodiments of the present invention, these tasks groups may be chosen based on data dependencies such that each task group may complete its processing of all the macroblocks in a picture (e.g., frame or field) or section before the macroblocks are sent to the next task group for subsequent processing.

Certain coding standards may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain. The data dependencies for the VCL IQ/IDCT decoding process 404 are typically at the macroblock level for macroblocks within the same slice. Consequently results produced by the VCL decoding process 304 may be buffered at the macroblock level.

VCL decoding 404 often includes a process referred to as Entropy Decoding 406, which is used to decode the VCL syntax. Many codes, such as AVC (H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC (H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC (H.264) bitstreams. Decoding the entropy layer of AVC(H.264)— coded data streams can be computationally intensive and may present challenges for devices that decode AVC (H.264)—coded bitstreams using general purpose microprocessors. For this reason, many systems uses a hardware decoder accelerator.

In addition to Entropy Decoding 406, the VCL decoding process 404 may involve inverse quantization (IQ) and/or inverse discrete cosine transformation (IDCT) as indicated at 408. These processes may decode the headers 409 and data from macroblocks. The decoded headers 409 may be used to assist in VCL decoding of neighboring macroblocks.

VCL decoding 404 may be implemented at a macroblock level data dependency frequency. Specifically, different macroblocks within the same slice may undergo VCL decoding in parallel and the results may be sent to the motion vector reconstruction task group 410 for further processing.

Subsequently, all macroblocks in the picture or section may undergo motion vector reconstruction 410. The MV reconstruction process 410 may involve motion vector reconstruction 412 using headers from a given macroblock 411 and/or co-located macroblock headers 413. A motion vector describes apparent motion within a picture. Such motion vectors allow reconstruction of a picture (or portion thereof) based on knowledge of the pixels of a prior picture and the relative motion of those pixels from picture to picture. Once the motion vector has been recovered pixels may be reconstructed at 416 using a process based on residual pixels from the VCL decoding process 404 and motion vectors from the MV reconstruction process 410. The data dependency frequency (and level of parallelism) for the MV depends on whether the MV reconstruction process 410 involves co-located macroblocks from other pictures. For MV reconstruction not involving co-located MB headers from other pictures the MV reconstruction process 410 may be implemented in parallel at the slice level or picture level. For MV reconstruction involving co-located MB headers the data dependency frequency is at the picture level and the MV reconstruction process 410 may be implemented with parallelism at the slice level.

The results of motion vector reconstruction 410 are sent to the picture reconstruction task group 414, which may be parallelized on a picture frequency level. Within the picture reconstruction task group 414 all macroblocks in the picture or section may undergo pixel prediction and reconstruction 416 in conjunction with de-blocking 420. The pixel prediction and reconstruction task 416 and the de-blocking task 420 may be parallelized to enhance the efficiency of decoding. These tasks may be parallelized within the picture reconstruction task group 414 at a macroblock level based on data dependencies. For example, pixel prediction and reconstruction 416 may be performed on one macroblock and followed by de-blocking 420. Reference pixels from the decoded picture obtained by de-blocking 420 may be used in pixel prediction and reconstruction 416 on subsequent macroblocks. Pixel prediction and reconstruction 418 produces decoded sections 419 (e.g. decoded blocks or macroblocks) that include neighbor pixels which may be used as inputs to the pixel prediction and reconstruction process 418 for a subsequent macroblock. The data dependencies for pixel prediction and reconstruction 416 allow for a certain degree of parallel processing at the macroblock level for macroblocks in the same slice.

The post processing task group 420 may include a de-blocking filter 422 that is applied to blocks in the decoded section 419 to improve visual quality and prediction performance by smoothing the sharp edges which can form between blocks when block coding techniques are used. The de-blocking filter 422 may be used to improve the appearance of the resulting de-blocked sections 424.

The decoded section 419 or de-blocked sections 424 may provide neighboring pixels for use in de-blocking a neighboring macroblock. In addition, decoded sections 419 including sections from a currently decoding picture may provide reference pixels for pixel prediction and reconstruction 418 for subsequent macroblocks. It is during this stage that pixels from within the current picture may optionally be used for pixel prediction within that same current picture as described above, independent of whether the picture (or subsections thereof) is inter-coded or intra-coded. De-blocking 420 may be parallelized on a macroblock level for macroblocks in the same picture.

The decoded sections 419 produced before post processing 420 and the post-processed sections 424 may be stored in the same buffer, e.g., the output picture buffer depending on the particular codec involved. It is noted that de-blocking is a post processing filter in H.264. Because H.264 uses pre-de-blocking macroblock as reference for neighboring macroblocks intra prediction and post-de-blocking macroblocks for future picture macroblocks inter prediction. Because both pre- and post-de-blocking pixels are used for prediction, the decoder or encoder has to buffer both pre-de-blocking macroblocks and post-de-blocking macroblocks. For most low cost consumer applications, pre-de-blocked pictures and post-de-blocked pictures share the same buffer to reduce memory usage. For standards that pre-date H.264, such as MPEG2 or MPEG4 except MPEG4 part 10, (note: H.264 is also called MPEG4 part 10), only pre-post-processing macroblocks (e.g., pre-de-blocking macroblocks) are used as reference for other macroblock prediction. In such codes, a pre-filtered picture may not share the same buffer with a post filtered picture.

Thus, for H.264, after pixel decoding, the decoded section 419 is saved in the output picture buffer. Later, the post processed sections 424 replace the decoded sections 419 in the output picture buffer. For non-H.264 cases, the decoder only saves decoded sections 419 in the output picture buffer. The post processing is done at display time and the post processing output may not share the same buffer as the decoder output picture buffer.

At least some portions of the decoding process 400 may be implemented on the hardware decoder 104. It is possible for a hacker to insert malicious code or data into the coded streaming data 401 that is received by the system 100. Such malicious code or data may be used to attack the system through unauthorized use of the hardware decoder 104. The hardware decoder accelerator security layer 114 can be configured to protect the hardware decoder 104 against such malicious attack.

Protecting the Hardware Decoder

To protect the hardware accelerator 104, the interface of the user applications 202 and the accelerator 104 must carry enough memory access information. If a user application 202 submits a request to the hardware decoder accelerator 104 the request must carry the addresses of all user buffers 208 accessed by the decoder 104. It also must carry all the necessary information to calculate the memory usage of the hardware accelerator 104. Some examples of such buffers used by a hardware accelerator 104 for different coding standards are listed in Table I below.

TABLE I

| | Video bitstream | Reference pixel | Reference macroblock header | Decoded Pixel | Macroblock temporal | Loop filter temporal | Bit plane |
|---|---|---|---|---|---|---|---|
| H.264 | Yes | Yes | Yes | Yes | Possible | Possible | No |
| MPEG2 | Yes | Yes | No | Yes | Possible | No | No |

TABLE I-continued

| | Video bitstream | Reference pixel | Reference macroblock header | Decoded Pixel | Macroblock temporal | Loop filter temporal | Bit plane |
|---|---|---|---|---|---|---|---|
| MPEG4 | Yes | Yes | Yes | Yes | Possible | No Possible | No Possible |
| VC1 | Yes | Yes | Yes | Yes | Possible | Possible | Possible |

For existing video coding standards, these buffer size related information are coded in the video stream above macroblock level. Table II shows how the buffer size information is coded in the stream for different video standards.

TABLE II

| Standard | |
|---|---|
| | Buffer name: Video bitstream size |
| All standards | Coded in a layer above video elementary stream or the number of bytes between start codes in video elementary stream. |
| | Buffer name: Reference pixel buffer size |
| AVC | Input stream profile, level, max dec frame buffering- and frame resolution |
| MPEG2 | Profile and frame resolution |
| MPEG4 | Profile and frame resolution |
| VC1 | Profile and frame resolution |
| | Buffer name: Reference macroblock header buffer size |
| AVC | Input stream profile, level, max dec frame buffering- and frame resolution |
| VC1 | Profile and frame resolution |
| | Buffer name: Decoded pixel buffer, macroblock intermediate data buffer, reference macroblock header buffer, loop filter intermediate data buffer and bit plane buffer size |
| All standards | Frame resolution and frame/field flag of the current picture |

After receiving a user request, the decoder protection layer 114 may calculate the necessary size of each buffer and verify if all memory within the range is valid. For better security, the user request message and all buffers in Table II, except video stream buffer and decoded pixel buffer, should be protected from any user process access once a task is submitted. Otherwise, a hacker would have a chance to replace a valid request with an invalid request, after the request is verified or, a hacker could change the content in these data buffers while the accelerator is processing these buffers.

Some examples of possible methods to protect these buffers against malicious use include, but are not limited to:
1. Copying the buffer from user memory space to a secure memory space
2. Locking the memory pages within the data range being written from by the user process. Note: the buffer size is calculated by the memory usage information in the user application submitted task request.

Typically, the decoded pixel buffer is "write only" for the accelerator 104. It is therefore usually not necessary to protect this buffer. In general, it may be impractical to protect the video stream buffer for a number of reasons. First, the size of this buffer may be very big and it may not be practical to copy all the data in this buffer into another memory space. Second, the user application may still be working on the bitstream buffer for other pictures. The coded picture size is not predictable. It is hard to align the picture boundary with memory page boundary. Consequently, it may not be practical to lock certain pages in the buffer from user access.

When the hardware accelerator 104 decodes coded streams at higher than macroblock level, the protection layer 114 could reject any input bitstreams for which the buffer size related parameters coded in the stream 401 mismatch these parameters in the user's request. This protects the hardware decoder accelerator 104 from buffer overflow attacks.

For all video coding standards, in each coded slice, the slice header carries information indicating the start position of the slice. In certain implementations the decoder protection layer 114 may check if the slice position is within the current picture boundary. If it is determined that a slice is not within the current picture boundary, this slice should be discarded since it might contain malicious code or data.

Furthermore, for each coded macroblock, the protection layer 114 may check if a current macroblock is within the current picture boundary, if the current macroblock is not within the current picture boundary, the protection layer 114 may discard this macroblock.

In the case of H.264, MPEG4 or VC1 stream decoding, for each macroblock, the protection layer 114 may check if a referred co-located reference macroblock header is with the reference macroblock header buffer. If it is not within the reference macroblock header buffer, this macroblock should be discarded.

In the case of MPEG2 stream decoding, the protection layer 114 should check if the motion vector is within the reference picture boundary. If it is not within the reference picture boundary, this macroblock should be discarded.

It is noted that because it is difficult to protect the input stream buffer as discussed above, for all bitstream checks above, the data value should be checked when the data is used. Otherwise, hacker will have a chance to alter the bitstream content between the time that the accelerator verifies the data and the time that the accelerator uses it.

Some Special Protection Cases

Not all the hardware has capability to lock certain buffers from user process access. For example, if a user application can access a macroblock intermediate data buffer, a hacker can alter the content in the buffer to instruct the accelerator to read system secret information as reference motion vectors or reference pixels. Therefore, depending on the content of the macroblock intermediate data buffer and reference macroblock header buffer, extra protection should be added for certain memory access operations. The following are some examples of suggested best practices that can implement these extra protections,
1. For all video standards, if motion vector is stored in macroblock intermediate data buffer, the accelerator must check each motion vector before reference pixel reading.
2. For H.264 and VC1 streams, if co-located macroblock motion vector is stored in reference macroblock header buffer, the accelerator security layer 114 must check the motion vector reference ID before each reference pixel reading.
3. For H.264, MPEG4 and VC1 streams, if a neighboring macroblock valid flag is stored in macroblock intermediate data buffer, the accelerator security layer 114 must check if neighboring macroblock is within the current picture boundary before any neighboring macroblock access.

Figure 5:
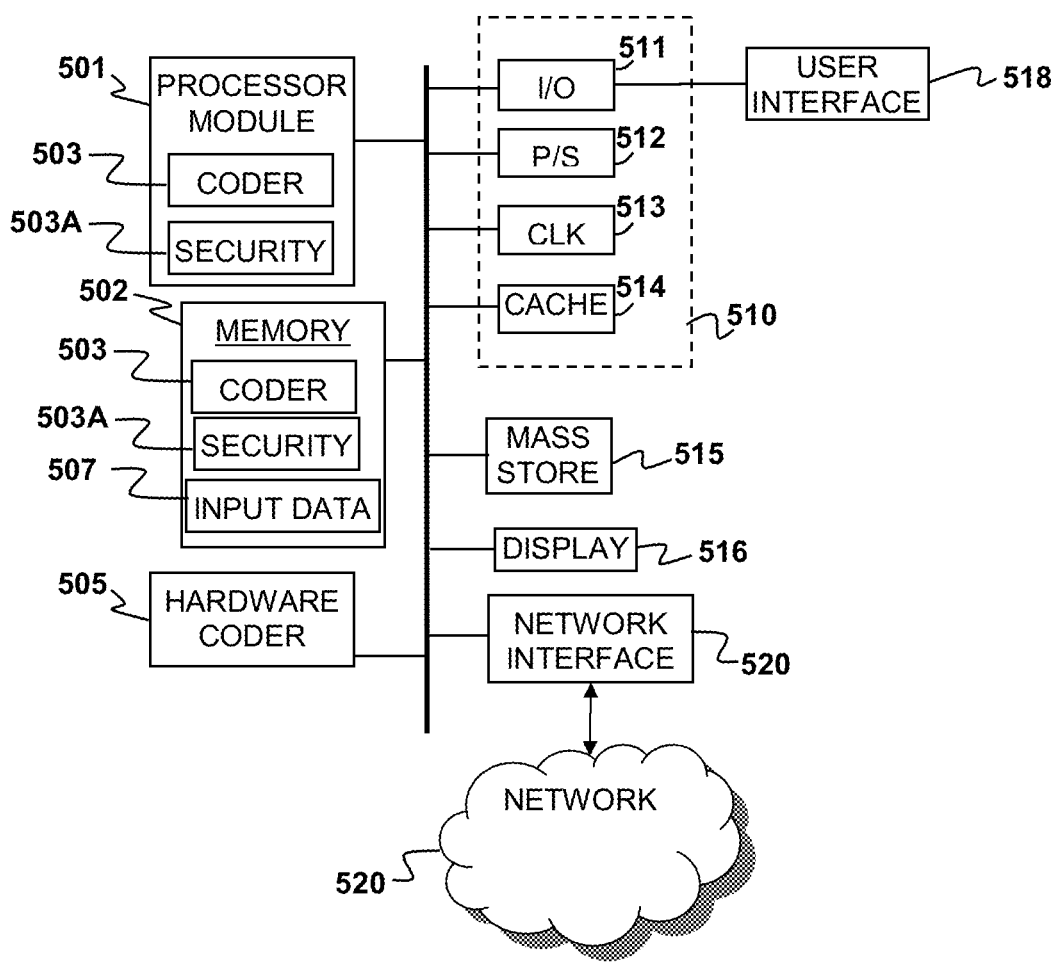
FIG. 5 is a block diagram of a computer system that may be used to implement video coding according to aspects of the present disclosure.

Aspects of the present disclosure include systems configured to implement hardware decoder accelerator security layer of the various types described above. By way of example, and not by way of limitation, FIG. 5 illustrates a block diagram of a computer system 500 that may be used to implement video coding according to aspects of the present disclosure. The system 500 generally may include a main processor module 501, a memory 502 and a hardware decoder 505. The processor module 501 may include one or more processor cores, e.g., single core, dual core, quad core, processor-coprocessor, Cell processor, architectures, and the like.

The memory 502 may be in the form of an integrated circuit, e.g., RAM, DRAM, ROM, and the like. The memory may also be a main memory that is accessible by all of the processor cores in the processor module 501. In some embodiments, the processor module 501 may have local memories associated with one or more processor cores or one or more co-processors. A software coder program 503 may be stored in the main memory 502 in the form of processor readable instructions that can be executed on the processor module 501. The coder program 503 may be configured to decode a picture into compressed signal data in conjunction with the hardware decoder accelerator 505, e.g., as described above. A hardware decoder accelerator security layer 503A may also be stored in the memory 502 and executed on the processor module 501. The security layer 503A is configured to implement additional security for the hardware coder accelerator, as discussed above. The coder program 503 and hardware decoder accelerator security layer 503A may be written in any suitable processor readable language, e.g., C, C++, JAVA, Assembly, MATLAB, FORTRAN and a number of other languages.

Input or output data 507 may be stored in memory 502. During execution of the coder program 503 and/or security layer 503A, portions of program code and/or data 507 may be loaded into the memory 502 or the local stores of processor cores for processing the processor 501. By way of example, and not by way of limitation, the input data 807 may include video pictures, or sections thereof, before encoding or decoding or at intermediate stages of encoding or decoding. In the case of encoding, the data 507 may include buffered portions of streaming data, e.g., unencoded video pictures or portions thereof. In the case of decoding, the data 507 may include input data in the form of un-decoded sections, sections that have been decoded, but not post-processed and sections that have been decoded and post-processed. Such input data may include data packets containing data representing one or more coded sections of one or more digital pictures. By way of example, and not by way of limitation, such data packets may include a set of transform coefficients and a partial set of prediction parameters. These various sections may be stored in one or more buffers. In particular, decoded and/or post processed sections may be stored in an output picture buffer implemented in the memory 502.

The system 500 may also include well-known support functions 510, such as input/output (I/O) elements 511, power supplies (P/S) 512, a clock (CLK) 513 and cache 514. The apparatus 500 may optionally include a mass storage device 515 such as a disk drive, CD-ROM drive, tape drive, or the like to store programs and/or data. The device 800 may also optionally include a display unit 516 and user interface unit 518 to facilitate interaction between the apparatus 500 and a user. The display unit 516 may be in the form of a cathode ray tube (CRT) or flat panel screen that displays text, numerals, graphical symbols or images. The user interface 518 may include a keyboard, mouse, joystick, light pen, or other device that may be used in conjunction with a graphical user interface (GUI). The apparatus 500 may also include a network interface 520 to enable the device to communicate with other devices over a network 522, such as the internet. The system 500 may receive one or more frames of encoded streaming data (e.g., one or more encoded video frames) from other devices connected to the network 522 via the network interface 520. These components may be implemented in hardware, software, or firmware, or some combination of two or more of these.

Aspects of the present disclosure provide additional protection against malicious attack on the system 500 through use of the hardware decoder accelerator security layer 503A.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method, comprising:
receiving one or more frames of encoded digital streaming data in a system having a processor module, a memory and a hardware decoder accelerator;
decoding the one or more frames of encoded digital streaming data using the hardware decoder accelerator;
using a software security layer to protect the system against exploitation of the hardware decoder accelerator by malicious data embedded in the one or more frames of encoded digital streaming data, wherein the software security layer performs a data value check on data within the one or more frames when the data is used.

2. The method of claim 1, wherein the software security layer is implemented in firmware of the system.

3. The method of claim 1, wherein the software security layer is implemented in a kernel driver in system software of the system.

4. The method of claim 1, wherein the software security layer is implemented in a software layer above a kernel driver in system software of the system.

5. The method of claim 1, wherein the software security layer is configured to calculate a necessary size of one or more buffers used in decoding the one or more frames and verify if all memory within a range is valid.

6. The method of claim 1, wherein the software security layer is configured to protect one or more buffers used in decoding the one or more frames from any user process access once a task is submitted.

7. The method of claim 6, wherein the software security layer is configured to copy the one or more buffers from a user memory space to a secure memory space.

8. The method of claim 6, wherein the software security layer is configured to locking one or more memory pages within a data range being written from by a user process.

9. The method of claim 1, wherein when the hardware accelerator decodes coded streams at higher than a macroblock level, the software security layer rejects any input bitstreams for which buffer size related parameters coded in the stream mismatch with these parameters in a user's request.

10. The method of claim 1, wherein software security layer checks if a slice position is within a current picture boundary and discards the slice when it is determined that a slice is not within the current picture boundary.

11. The method of claim 1, wherein for each coded macroblock in the one or more frames the software security layer checks if a given macroblock in the one or more frames is within a current picture boundary and discarding the given macroblock if it is not within the current picture boundary.

12. The method of claim 1, wherein for each macroblock in the one or more frames the software security layer checks if a header of a referred co-located reference macroblock is within a reference macroblock header buffer and discards the referred co-located macroblock when the header of the referred co-located reference macroblock is not within the reference macroblock header buffer.

13. The method of claim 1, wherein the software security layer checks if a motion vector in a macroblock in the one or more frames is within a reference picture boundary and discards the macroblock when the motion vector is not within the reference picture boundary.

14. A system, comprising:
a processor module;
hardware decoder accelerator coupled to the processor; and
a memory coupled to the processor, wherein the memory contains executable instructions configured to implement a method, the method comprising:
receiving one or more frames of encoded digital streaming data at the system;
decoding the one or more frames of encoded digital streaming data using the hardware decoder accelerator;
using a software security layer to protect the system against exploitation of the hardware decoder accelerator by malicious data embedded in the one or more frames of encoded digital streaming data, wherein the software security layer performs a data value check on data within the one or more frames when the data is used.

15. The system of claim 14, wherein the software security layer is implemented in firmware of the system.

16. The system of claim 14, wherein the software security layer is implemented in a kernel driver in system software of the system.

17. The system of claim 14, wherein the software security layer is implemented in a software layer above a kernel driver in system software of the system.

18. The system of claim 14, wherein the software security layer is configured to calculate a necessary size of one or more buffers used in decoding the one or more frames and verify if all memory within a range is valid.

19. The system of claim 14, wherein the software security layer is configured to protect one or more buffers used in decoding the one or more frames from any user process access once a task is submitted.

20. The system of claim 19, wherein the software security layer is configured to copy the one or more buffers from a user memory space to a secure memory space.

21. The system of claim 19, wherein the software security layer is configured to locking one or more memory pages within a data range being written from by a user process.

22. The system of claim 14, wherein when the hardware accelerator decodes coded streams at higher than a macroblock level, the software security layer rejects any input bitstreams for which buffer size related parameters coded in the stream mismatch with these parameters in a user's request.

23. The system of claim 14, wherein software security layer checks if a slice position is within a current picture boundary and discards the slice when it is determined that a slice is not within the current picture boundary.

24. The system of claim 14, wherein for each coded macroblock in the one or more frames the software security layer checks if a given macroblock in the one or more frames is within a current picture boundary and discarding the given macroblock if it is not within the current picture boundary.

25. The system of claim 14, wherein for each macroblock in the one or more frames the software security layer checks if a header of a referred co-located reference macroblock is within a reference macroblock header buffer and discards the referred co-located reference macroblock when the header of the referred co-located reference macroblock is not within the reference macroblock header buffer.

26. The system of claim 14, wherein the software security layer checks if a motion vector in a macroblock in the one or more frames is within a reference picture boundary and discards the macroblock when the motion vector is not within the reference picture boundary.

27. A non-transitory computer readable medium having embodied therein computer readable instructions configured, to implement a method, the method comprising:
receiving one or more frames of encoded digital streaming data in a system having a processor module, a memory and a hardware decoder accelerator decoding the one or more frames of encoded digital streaming data using the hardware decoder accelerator;
using a software security layer to protect the system against exploitation of the hardware decoder accelerator by malicious data embedded in the one or more frames of encoded digital streaming data, wherein the software security layer performs a data value check on data within the one or more frames when the data is used.

* * * * *